United States Patent [19]

Vdoviak et al.

[11] Patent Number: 5,694,767
[45] Date of Patent: Dec. 9, 1997

[54] VARIABLE SLOT BYPASS INJECTOR SYSTEM

[75] Inventors: John William Vdoviak, Marblehead, Mass.; Donald Patrick McHugh, Cincinnati, Ohio

[73] Assignee: General Electric Company, Cincinnati, Ohio

[21] Appl. No.: 317,356

[22] Filed: Nov. 2, 1981

[51] Int. Cl.⁶ .................................................. F02K 3/04
[52] U.S. Cl. ............................ 60/226.3; 60/261; 60/262
[58] Field of Search .................................. 60/224, 226.1, 60/226.3, 261, 262, 264, 271

[56] References Cited

U.S. PATENT DOCUMENTS

| | | |
|---|---|---|
| 3,750,402 | 8/1973 | Vdoviak et al. . |
| 4,026,472 | 5/1977 | Rabone . |
| 4,043,121 | 8/1977 | Thomas et al. . |
| 4,050,242 | 9/1977 | Dusa . |
| 4,064,692 | 12/1977 | Johnson et al. . |
| 4,068,471 | 1/1978 | Simmons . |
| 4,069,661 | 1/1978 | Rundell et al. . |
| 4,072,008 | 2/1978 | Kenworthy et al. . |
| 4,086,761 | 5/1978 | Schaut et al. . |
| 4,215,536 | 8/1980 | Rudolph . |
| 4,226,084 | 10/1980 | Spears, Jr. . |
| 4,275,560 | 6/1981 | Wright et al. . |
| 4,285,194 | 8/1981 | Nash . |
| 4,376,375 | 3/1983 | Boudigues ........................ 60/226.3 |
| 4,409,788 | 10/1983 | Nash et al. ....................... 60/226.3 |

*Primary Examiner*—Michael J. Carone
*Attorney, Agent, or Firm*—Andrew C. Hess; Wayne O. Traynham

[57] ABSTRACT

An afterburning, gas turbine aircraft engine with an annular duct for carrying bypass airflow is provided with a sliding valve type of rear Variable Area Bypass Injector (VABI) system. This rear VABI varies the direction and volume of the flow of bypass air into separate regions at an afterburning section of the engine. The system includes a sliding valve mounted in the bypass duct that is translated axially to open and close slots leading to core engine exhaust flow in the afterburning section. The unique structure of the injector system enables the axial translation of this sliding valve to simultaneously control bypass airflow into: first, a mixer just upstream of the afterburning section; second, a plurality of slots leading to the afterburning section; and third, an exhaust nozzle cooling liner that is cooled with the remaining portion of the bypass air. The system is actuated with a mechanical design that uses both rotation and translation to simplify the actuation motion so that one actuator can translate the valve. Because the system employs a valve that translates over a plurality of slots, it is commonly referred to as a variable slot bypass injector.

21 Claims, 5 Drawing Sheets

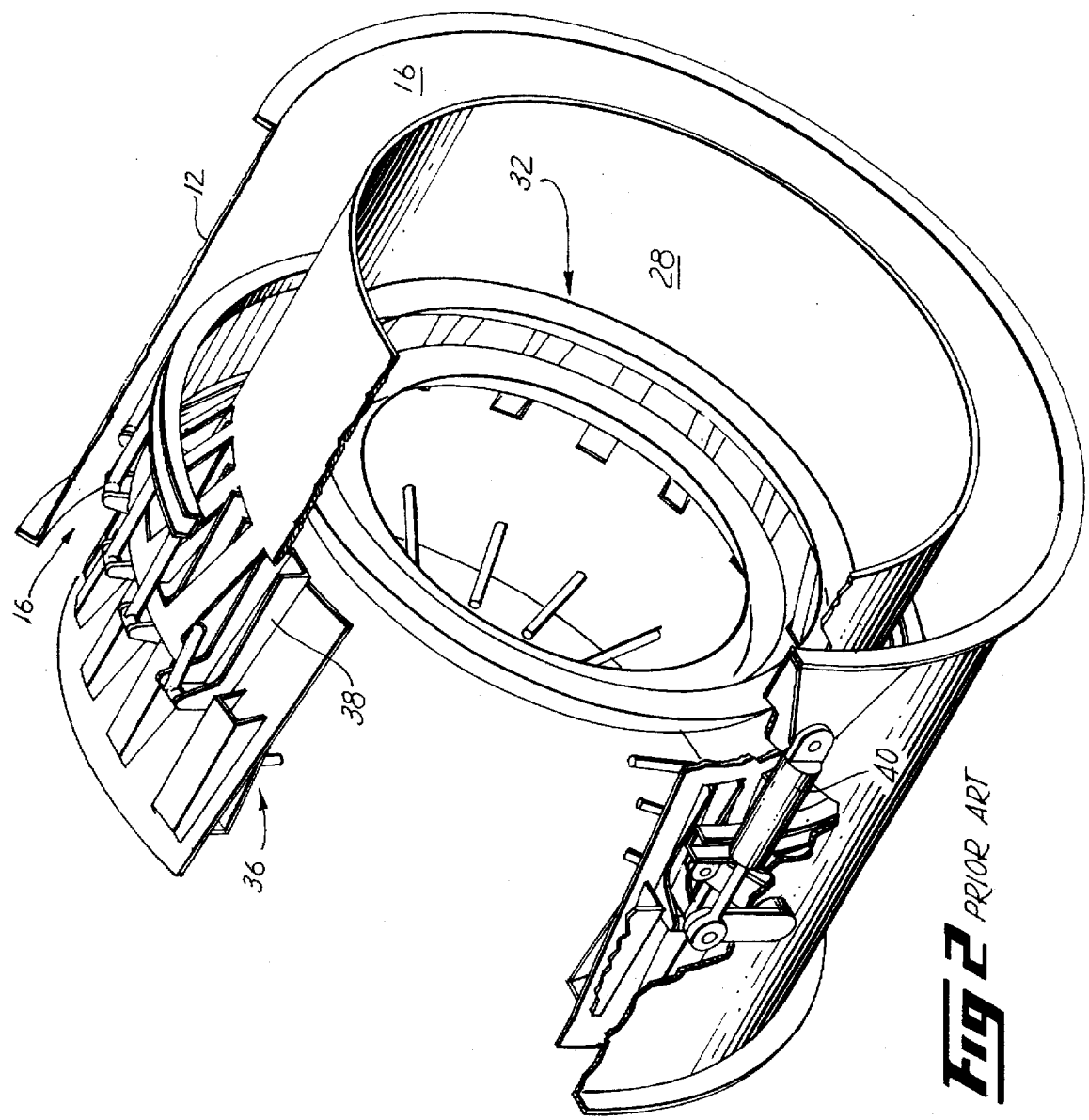

VARIABLE SLOT BYPASS INJECTOR SYSTEM

The United States Government has rights in this invention pursuant to Contract No. N00019-80-C-0017 awarded by the Department of the Navy.

BACKGROUND OF THE INVENTION

1. Field of the Invention

The invention relates to afterburning (augmented) gas turbine aircraft engines of the bypass type and, more particularly, to mixed flow augmented gas turbine engines suitable for efficiently powering aircraft at widely varying flight speeds by controlling the engine bypass flow to satisfy correspondingly different engine operating conditions.

2. Description of the Prior Art

In the course of the development of the gas turbine aircraft engine, at least two basic variations of such engines have evolved that are suitable for powering aircraft at speeds that approach or exceed Mach 1. The two variations are the turbojet and the turbofan.

In a turbojet engine, the engine's turbine section receives the combustion gases and extracts only the power required to drive the compressor and accessories necessary for continuous operation. The remaining power of the combustion gases is used to provide forward thrust by accelerating the gases through an exhaust nozzle and out the downstream end of the engine. The turbojet engine is particularly effective for developing the high thrust necessary for powering aircraft at speeds in excess of Mach 1.

In a turbofan engine, the turbine section extracts power from the combustion gases to drive the compressor and accessories and extracts additional power in order to drive a fan section that accelerates air to provide forward thrust for the aircraft. The air accelerated by the fan is called bypass air because it bypasses the engine core. The turbofan or bypass engine is best suited for powering aircraft at speeds approaching but not attaining Mach 1.

A great deal of effort has been directed at developing a gas turbine engine with the attributes of both a turbojet and a turbofan. Ideally, an engine would have the high specific thrust characteristics of a turbojet but could also be configured to exhibit the lower specific thrust, and better fuel consumption characteristics of a turbofan. This type of engine would be used in mixed-mission type aircraft.

Engines that are suitable for these mixed-missions have been developed in various forms with varying degrees of success. Low bypass turbofans of fixed geometry are in current production—and even more operative flexibility has been obtained with variable cycle/bypass engines in which the amount of air that is bypassed is changed to suit aircraft speed. Perhaps the greatest problem with many of the variable cycle engines to date is the added complexity, weight and cost required by the structures that provide the variable bypass feature.

Variable bypass systems have been considered for use in typical military engines that use augmentors (afterburners) to provide additional thrust at supersonic speeds. Afterburning turbofan engines typically utilize mixers that take part of the engine's bypass air and mix or inject that air into the core engine flow in an engine's afterburning section. This allows more of the total engine airflow to be utilized with the afterburner for maximum thrust potential and also permits the use of a single throat variable exhaust nozzle. In these afterburning engines a substantial portion of the bypass flow is devoted to augmentor and nozzle cooling. Experimentation has shown that variable cycle engines that vary the amount of bypass air injected at the afterburner region can obtain significant performance advantages. Typically, it is desirable to increase the total bypass flow at dry operating conditions and to reduce the bypass flow at augmented conditions. Under dry conditions the object is to improve specific fuel consumption and during augmented conditions the object is to improve thrust. Systems that inject the bypass air at the afterburner have been commonly referred to as rear Variable Area Bypass Injectors (rear VABI's). Some examples of such rear VABI's are described in various U.S. Patents including U.S. Pat. No. 4,069,661; U.S. Pat. No. 4,064,692; U.S. Pat. No. 4,072,008; and U.S. Pat. No. 4,068,471.

One particular version of these recently developed rear VABI's utilizes what as commonly referred to as a variable/ drop chute type of mixer injector. The term "drop chute" is used because the system employs mixer chutes that are hinged to be "dropped" or deployed inwardly and outwardly relative to the core engine flow so the chutes can inject varying amounts of bypass flow into the core engine stream. Although this provides many of desired thermodynamic advantages, which permit gains in engine performance, the drop chute type of rear VABI can be a relatively heavy, complex design that is not readily adaptable into existing engine configurations.

OBJECT OF THE INVENTION

It is, therefore, an object of the present invention to provide an augmented, mixed flow, gas turbine engine with a system that can vary bypass airflow injection into the core engine flow and, additionally, can be incorporated into existing augmented turbofan engine configurations.

It is another object of the present invention to provide an augmented mixed flow gas turbine engine that incorporates a rear variable area bypass injector (rear VABI) that can simultaneously vary the proportions of bypass air that is injected into core engine flow at a position upstream of the afterburning section and, additionally, at a position in the afterburning section itself.

It is another object of the present invention to provide an augmented mixed flow gas turbine engine with a system that is capable of increasing the injection of bypass flow into the core engine flow, downstream of an augmentor flameholder, for lower pressure losses under those conditions where it is desirable to increase the bypass ratio.

It is another object of the present invention to provide an augmented mixed flow gas turbine engine with a system that is capable of varying the injection of bypass flow through a mixer into core engine flow upstream of the afterburning section while simultaneously varying the injection of bypass flow into the core engine flow at a position in the afterburning section and additionally will vary a flow of bypass air into an exhaust nozzle cooling liner.

SUMMARY OF THE INVENTION

These and other objects of the invention are achieved in an embodiment of the invention wherein a gas turbine, bypass engine is provided with a rear Variable Area Bypass Injector (VABI) system that incorporates a sliding valve configuration to vary the amount of bypass flow injected into an afterburning section to improve engine performance.

In one embodiment of this unique VABI system, all of the bypass air is directed into one of three separate paths. In a first path, a major portion of the bypass air is directed into a fixed geometry daisy mixer just upstream of the afterburning section of the engine. This daisy mixer injects the bypass air directly into a core engine stream in the plane of the engine's augmentor flameholders so that this bypass air is available for combustion in the afterburner section. It is generally desirable to maximize this flow during supersonic aircraft operation when the afterburner is in operation.

That portion of the bypass air that is not directed into the mixer is directed into an annular passage that circumferentially surrounds the afterburning section of the engine. A plurality of air admission slots is circumferentially distributed in this annular passage at a region just downstream of the augmentor's flameholders. A valve is provided that slides axially to cover and uncover these air slots and thereby modulate a second flow of bypass air that flows through the slots and enters the core engine stream downstream of the augmentor flameholders.

The axial movement of the sliding valve also cooperates with a liner valve to additionally control a third flow of bypass air into an exhaust nozzle cooling liner that surrounds the engine exhaust region through the full downstream portion of the afterburning section.

With this configuration, the rear VABI of this invention can be arranged to direct a majority of the bypass air through the daisy mixer and into the core engine flow before it enters the afterburning section. This type of mixing of bypass flow is desirable when the afterburners are burning fuel and require large amounts of air to support the combustion. On the other hand, the slide valve can be rearranged to uncover the slots so that bypass air can flow through these slots effectively increasing the rear cross sectional area of the bypass duct and thereby lessening flow path restrictions on the bypass flow. A less restricted bypass flow is highly desirable during non-afterburning (dry) operation such as subsonic cruising. An intermediate position of the slide valve will keep the air slots closed, yet completely open the entry into the exhaust nozzle liner. This can be highly desirable to keep the nozzle liner cooled at certain times during afterburning operation while still directing most of the bypass flow through the mixer into the afterburners.

BRIEF DESCRIPTION OF THE DRAWINGS

The invention may be better understood upon reading the following description of a preferred embodiment in conjunction with the accompanying drawings wherein:

FIG. 2 is a perspective view of a prior art, Variable Area Bypass Injector (VABI);

DESCRIPTION OF THE PREFERRED EMBODIMENT

Figure 1:
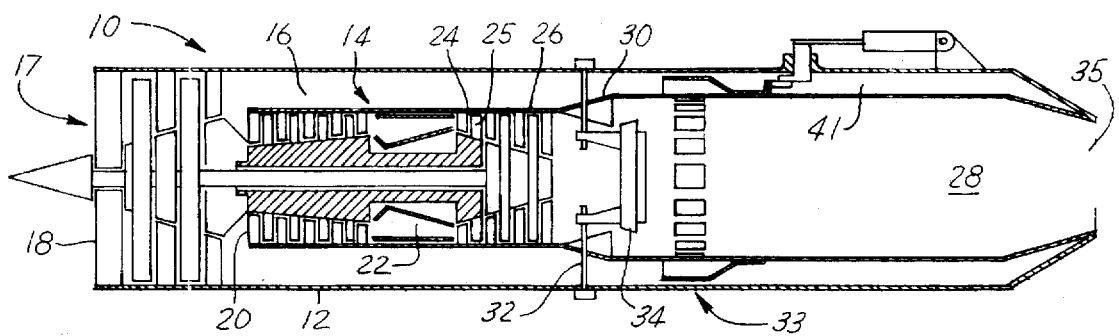
FIG. 1 is a cross-sectional view of an augmented, mixed flow, gas turbine engine incorporating variable bypass injection mixing concepts of the present invention.

Referring now to FIG. 1, there is shown a mixed flow gas turbine engine 10 having an outer casing 12 spaced apart from and surrounding an inner core engine 14. A passage or annular bypass duct 16 is formed between the casing 12 and the core engine 14. The mixed flow engine 10 has an inlet 17 that includes a fan section 18 that receives and pressurizes an inlet airflow, a portion of which is directed into the core engine 14 and the remainder of which is directed into the bypass duct 16. The core engine includes a compressor 20 that further compresses the inlet airflow and discharges highly compressed air into a combustor 22. In the combustor 22, fuel is burned in the highly compressed air to provide high energy combustion gases that drive a high pressure (HP) turbine 24. The HP turbine 24 operates to extract energy from the high energy combustion gases through the use of rotating turbine blades 25. The HP turbine 24 converts this extracted energy into shaft horsepower for driving the compressor 20.

Disposed downstream of the HP turbine, in a position to receive the flow of hot gases leaving the HP turbine 24, is a low pressure (LP)turbine 26, so-named because the combustion gases have dropped in pressure somewhat after some of their energy has been extracted by the HP turbine. Additional energy is extracted from the combustion gases by the LP turbine, again for conversion into shaft horsepower, but this time to drive the fan section 18.

From the LP turbine 26, the core engine combustion gases flow into an engine exhaust region 28. Just downstream of the LP turbine 26, a daisy mixer 30 is located in an interface region between the engine exhaust region 28 and the bypass duct 16. This mixer 30 functions to channel bypass airflow from the bypass duct 16 directly into the core engine stream after the core engine stream is exhausted from the HP and LP turbines. A daisy-type mixer is well suited for this mixing function because it will direct one gas flow into another gas flow stream in an efficient manner with generally low pressure losses.

Downstream of both the mixer 30 and the core engine 14, fuel injector spraybars 32 are provided in an afterburning section 33 to carburate the core engine exhaust flow during augmented (afterburning) engine operation. This injected fuel ignites and burns at flameholders 34 and flows at high velocities through the exhaust region 28 and out an engine exhaust nozzle 35.

Those skilled in the art of jet engine design have realized that it can be desirable to vary the manner in which the bypass flow is mixed with the core engine stream. For example, when the afterburning section 33 is operating, it can be advantageous to direct all of the bypass flow into the core engine stream so that all of the oxygen in the bypass flow is available to the augmentors during combustion. When the engine's flameholders 34 are not ignited, it can be desirable to increase the bypass flow and inject a portion of that flow at a location downstream of the flameholders 34 and thereby decrease mixing losses.

For these and other reasons, experimentation with variable cycle engine concept demonstrators has shown gains above those obtained with fixed mixers by using a rear mixer that is variable in its discharge area. Such variable mixers have been described as rear Variable Area Bypass Injectors (rear VABI's).

Referring now to FIG. 2, one prior art form of a rear VABI 36 is shown mounted on a rear section of a bypass type engine that is similar to the engine shown in FIG. 1. This rear VABI 36 is referred to as a "drop chute" type rear VABI. The name "drop chute" is used because this VABI has multiple movable chutes 38 that are "dropped" radially inwardly to directly inject bypass flow into the core engine stream. The chutes are hinged so they can be "dropped" to varying degrees by a series of actuators 40. By varying the degree or angle to which the chutes are "dropped", the discharge area of the augmentor mixer is thereby varied to suit engine operational conditions.

While the "drop chute" rear VABI shown in FIG. 2 does attain certain very desirable thermodynamic advantages, actual assemblies can be somewhat heavy, complex and also can be relatively expensive due to the large number of moving parts, linkages and actuators.

Figure 3:
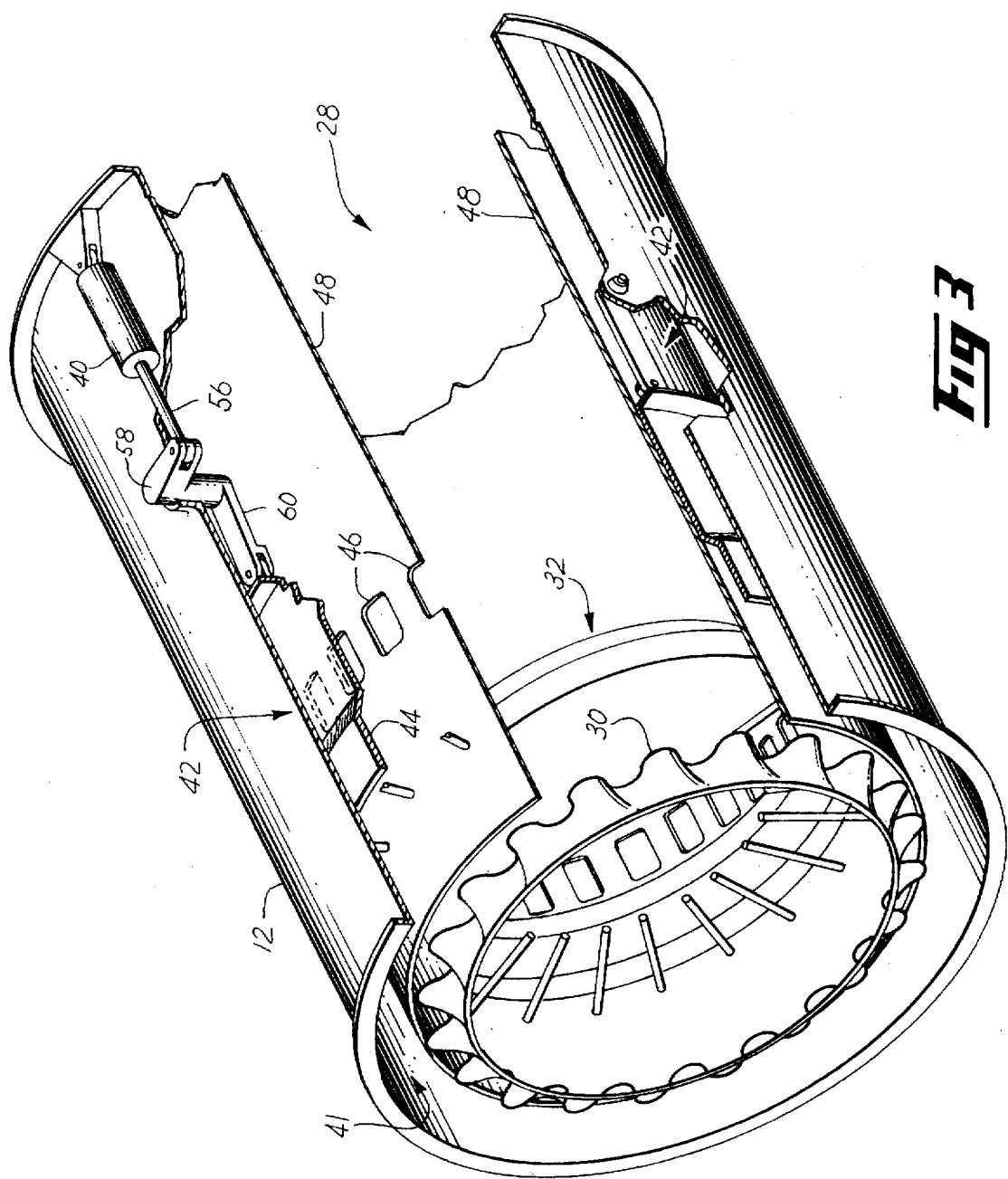
FIG. 3 is an enlarged perspective view of a portion of the gas turbine engine of FIG. 1 that incorporates one embodiment of the present invention.

Referring now to FIG. 3, one embodiment of the present invention is shown mounted on a rear section of the bypass-type engine that is shown in FIG. 1. Both the drop chute mixer shown in FIG. 2 and the present invention shown in FIG. 3 are capable of varying mixing area. As stated earlier the drop chute mixer 36 does this by dropping the chutes 38 further into the core engine stream. The present invention, which will be referred to as variable slot VABI 42, changes the mixing area by axially translating a cylindrical sleeve valve 44 to vary the area of outlet means from an annular passage 41 that circumscribes the exhaust region 28 of the engine. A disadvantage of the drop chute VABI 36 is that the individual chutes must be projected directly into the core engine stream. This type of projection requires linkage and unison ring hardware to integrate the individual chutes. Additionally the core engine exhaust forces on these projected chutes are a significant consideration and the drop chute system must be made sufficiently strong to withstand the core engine stream pressure forces. In contrast, by using the translating sleeve valve 44, the present invention variable slot VABI 42 inherently requires lower actuating forces and relatively lighter components due to lower metal and air friction forces.

Figure 4:
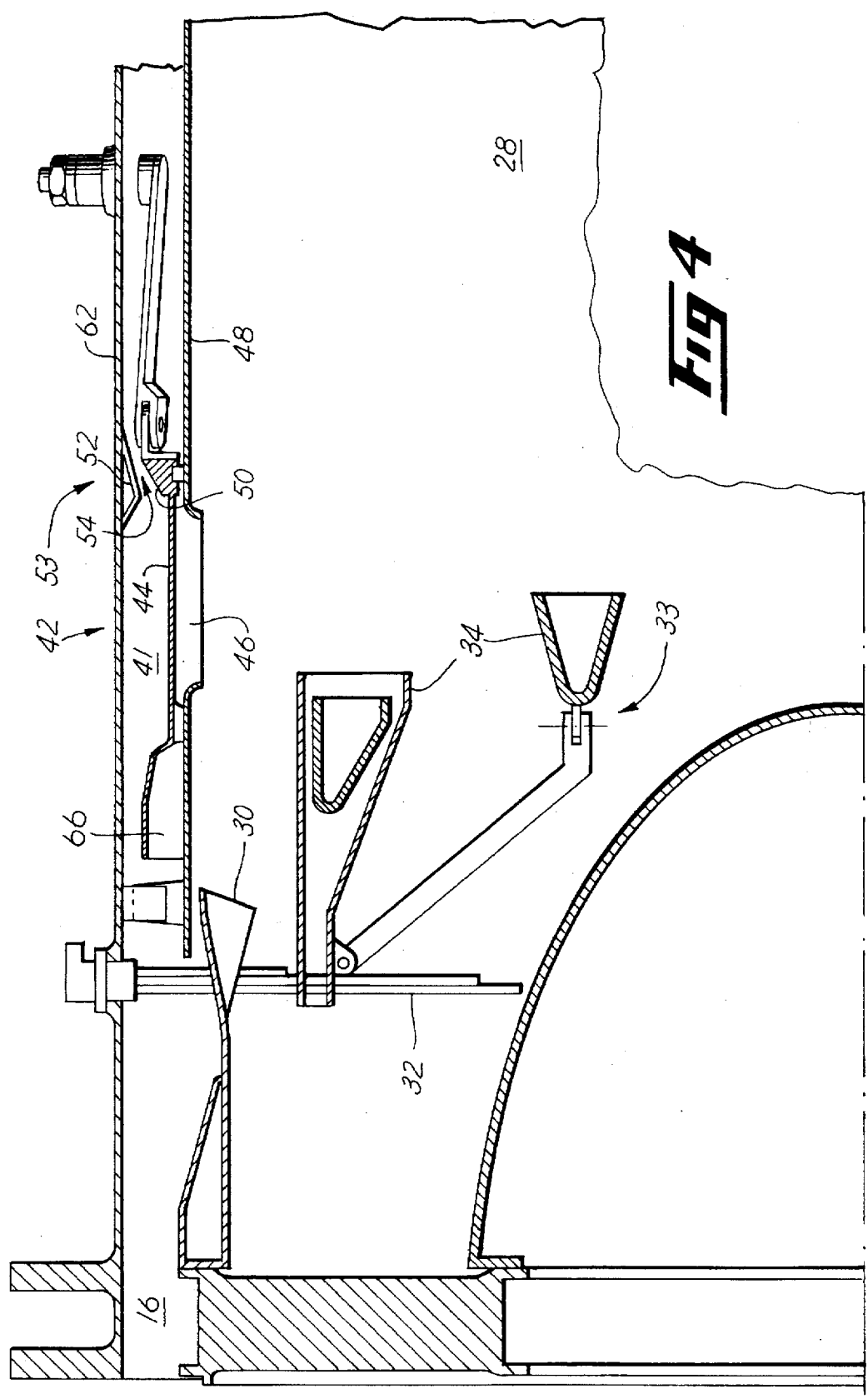
FIG. 4 is an enlarged cross-sectional view of the present invention and certain portions of the gas turbine engine of FIG. 1.

Referring now to FIG. 4, the variable slot VABI 42 is shown in relation to an engine's exhaust region 28 and afterburning section 33. The flameholders 34 in conjunction with the fuel injecting spraybars 32 largely make up the augmentor combustion system. There are shown in FIG. 4 a circumferential array of fixed daisy mixer chutes 30. These mixer chutes 30 are located at a downstream end of the bypass duct 16 of the engine and at a leading edge of an augmentor cooling liner 48. This location can be described as an interface region between the bypass duct and the core engine stream. The mixers 30 direct a majority of the bypass flow directly into the core engine flow stream at a location upstream of the flameholders 34 so the bypass flow can provide oxygen to the augmentor when it is operating. These fixed mixers are normally used in conventional turbofan augmentors.

An outlet means to the annular passage 41 is shown in the form of ports or air admission slots 46 located upstream of the cooling liner 48. The individual slots 46 are positioned directly downstream of, and in alignment with, each of individual chutes of the daisy mixer 30.

In FIG. 4, the cylindrical sleeve valve 44 is shown in a "closed" position meaning that the sleeve closes off the slots 46 and prevents bypass air from flowing through the slots. This forces a majority of the bypass flow to pass through the daisy mixer 30 and effectively lessens the rear bypass mixing area.

It can also be appreciated from FIG. 4 that a downstream end of the sleeve valve 44 includes a circumferential flange 50 that cooperates with an exhaust casing projection 52 to limit the flow of bypass air through a liner passage 54 thereby forming a liner valve 53 between the cooling liner 48 and exhaust casing 62. In the arrangement of the variable slot VABI 42 shown in FIG. 4, the slots 46 are completely closed off as stated above, and additionally, the area of the cooling liner passage 54 is in a "minimum" configuration. This is the same arrangement of the VABI 42 that is shown in FIG. 3, meaning again, the slots 46 are closed off and the area of the passage 54 is "minimum." This configuration creates a minimum rear mixer area, for lowest bypass flow, and highest engine specific thrust.

Figure 5:
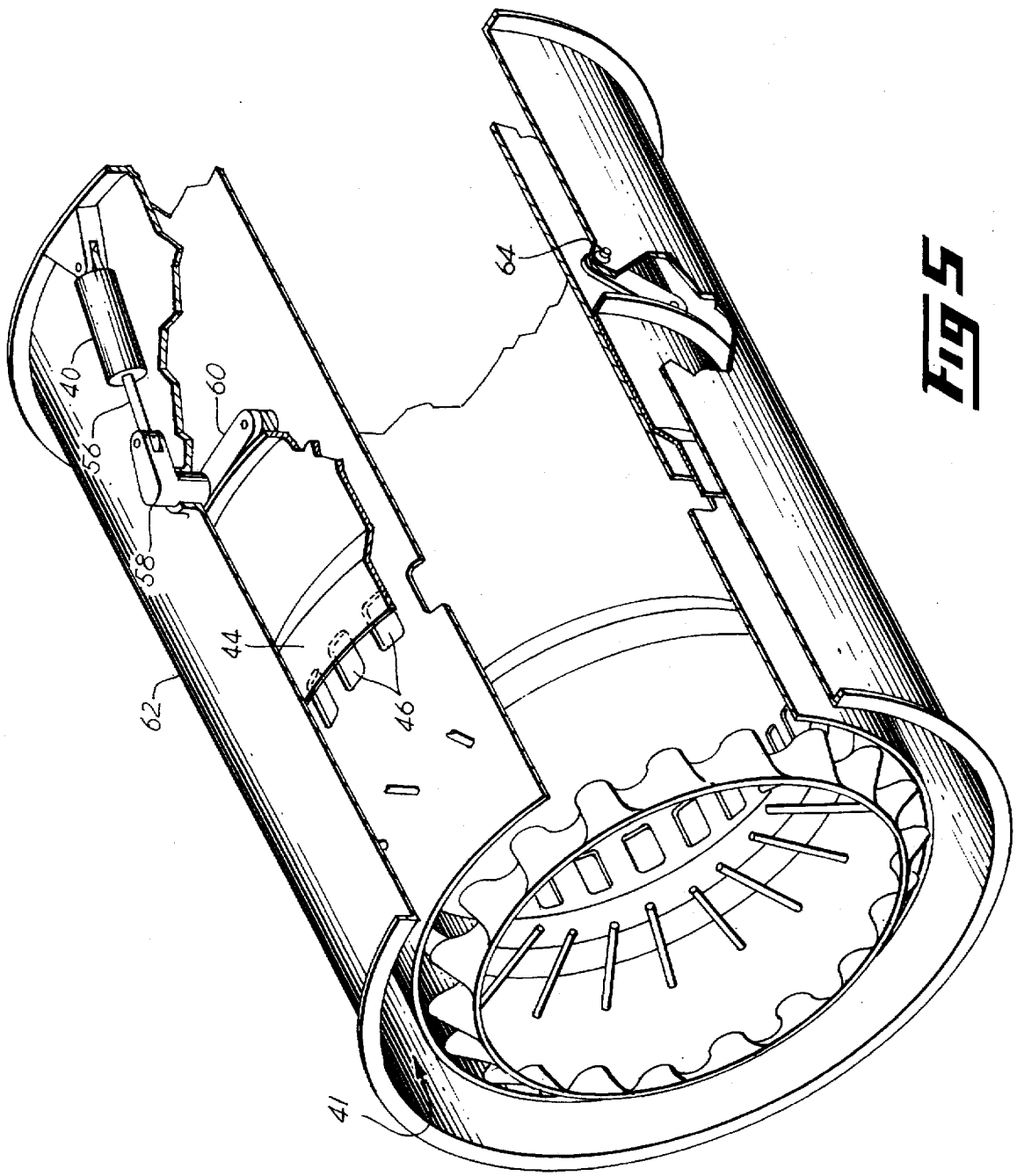
FIG. 5 is an enlarged perspective view of an embodiment of the present invention as shown in FIG. 3, but in a different operational mode.

Referring now to FIG. 5, the variable slot VABI 42 is shown in a configuration wherein the sleeve valve 44 has been translated downstream in relation to engine airflow to "open" the slots 46. This permits the engine's bypass flow to pass through both the daisy mixer 30 and the slots 46, in tandem, effectively increasing the rear mixer area. The sleeve 44 comprises a circumferentially disposed scoop 66 that directs the bypass flow into the outlet means in the annular passage 41. It is to be noted that in this position the liner cooling valve 53 from FIG. 4 is also fully opened.

To accomplish this translation, the sleeve valve 44 is moved axially with a system that uses the valve 44 itself as a synchronizing ring. To move the valve 44, the single actuator 40 extends and retracts an arm 56 that pivotally attaches to a rotating crank 58. Extension and retraction of the arm 56 causes the crank 58 to rotate which, in turn, causes cylinder arm 60 to swing through an arc. The cylinder arm 60 is pivotally connected to the sleeve valve 44 so that the swinging action of the arm causes the sleeve to move axially and circumferentially in a helical path between the cooling liner 48 and engine exhaust casing 62. This helical pattern provides the aforementioned synchronizing action which allows only one actuator to accomplish the required motion. It can be visualized that if the cylinder 58 did not rotate in conjunction with axial translation, that it would cock and bind. In addition to the actuator 40 and crank 58, two or more pivots 64 are provided around the circumference of the sleeve valve 44. The pivots 64 connect the sleeve valve 44 to the exhaust casing 62 at spaced positions to facilitate the axial and circumferential (helical) motion of the sleeve valve 44 during its translational movement.

Referring back to FIG. 3 the actuator arm 56 in this Figure is extended outwardly. Outward extension of the actuator arm 56 places the sleeve valve 44 in a forward position thereby "closing" the slots 46.

By contrast, in FIG. 5, the actuator arm 56 has been retracted causing the sleeve valve 44 to translate to a rear or downstream position in respect to engine airflow thereby "opening" the slots 46. It can be readily appreciated that because the cylinder arm 60 swings through an arc some circumferential or helical motion of the sleeve valve 44 always accompanies the axial motion of that sleeve valve. The sleeve valve is supported inside the exhaust casing 62 with pivots 64 that are mounted circumferentially around the perimeter of the exhaust casing 62 which center the valve with respect to the casing. The circumferential movement of the sleeve valve 44 forces the pivots 64 to move in unison. This uniform movement causes the sleeve valve 44 to retain a self-synchronizing feature that, together with inherently low actuation forces, allows the use of a single actuator to translate the sleeve valve 44. The circumferential motion of the valve 44 does not influence the aerodynamic operation of the VABI 42, in that all the aerodynamic aspects of the valve are symmetrical in the axial direction.

OPERATIONAL DESCRIPTION

The foregoing description of the invention has been directed to the mechanical configuration and mechanical operation of the variable slot VABI 42. It is now appropriate to describe the use of the VABI 42 in relation to different modes of operation of the engine and the aircraft.

Referring again to FIG. 1, the position and relationship of the variable slot VABI 42 to the overall engine 10 can be readily appreciated. As stated earlier, the rear VABI will vary the mixing area where bypass airflow from the bypass duct 16 actually mixes with the core engine flow in the engine's exhaust region 28. Engine cycle studies show that gains in engine thrust can be achieved at conditions of maximum power dry combat and maximum acceleration with augmention (afterburning) by using a rear VABI to alter the mixing area. In addition, specific fuel consumption can be improved with a rear VABI at part power cruise and loiter operation of the aircraft. These improvements are in relation to a typical fixed area rear mixer engine (nominal) where the rear mixer area is fixed but the area has been chosen so as to provide reasonably good engine performance over the full range of engine operational modes. This nominal case must necessarily be a compromise and is simply improved upon by operation of a rear VABI.

Figure 6:
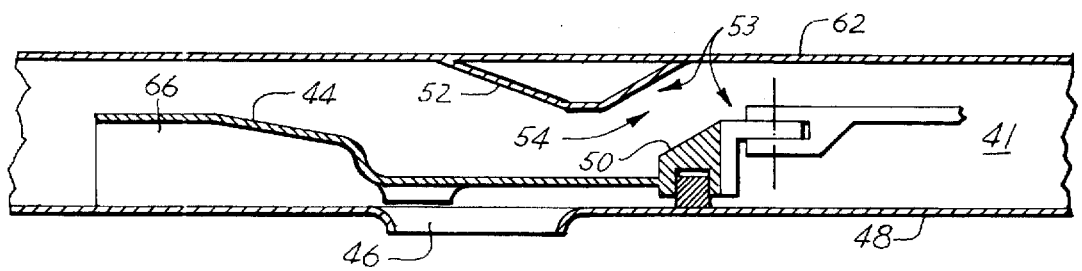
FIG. 6 is a cross-sectional view of the VABI of the present invention in a "nominal" mode of operation.

An equivalent of the nominal case is achieved when the sleeve valve 44 of the variable slot VABI 42 is brought to an intermediate position. Referring now to FIG. 6 the desired position of the sleeve valve 44 is shown in relation to the engine's exhaust cooling liner 48, exhaust casing 62 and associated components. In this intermediate or "nominal" position the sleeve valve 44 has effectively closed the slots 46 so the bypass air cannot flow through these slots. At the same time, the axial position of the sleeve valve 44 is such the circumferential flange 50 of the sleeve valve is positioned somewhat downstream of the exhaust casing projection 52, thereby opening the liner passage 54. This nominal position decreases the mixing area from maximum but still permits a flow of bypass air through the liner passage 54 to cool the engine's exhaust cooling liner 48. This nominal position can be highly desirable during certain operational modes including maximum afterburning operation at low flight speeds to cool the liner downstream of the augmentors.

Figure 7:
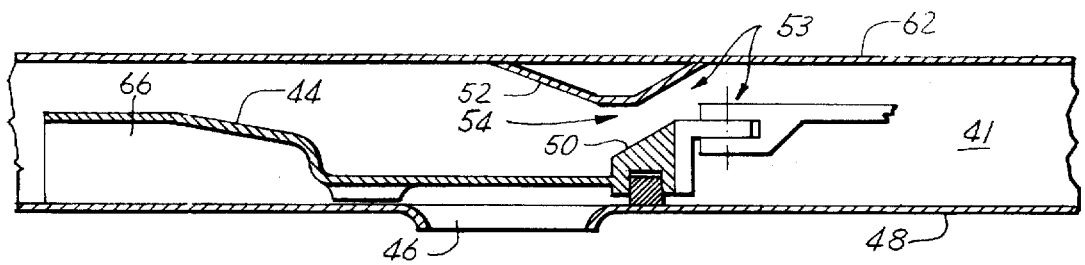
FIG. 7 is a cross-sectional view of the VABI of the present invention in a "closed" mode of operation.

In order to obtain objective thrust improvement gains during supersonic afterburning conditions, the VABI 42 is closed from the nominal case to reduce the bypass ratio and improve the specific thrust. At least part of the reason for doing this is that a natural result of turbofan engine operation is the bypass ratio tends to increase with flight speed. To maintain or decrease the bypass ratio the appropriate position of the sleeve valve 44 for closing the VABI 42 is shown in FIG. 7. The valve 44 has been translated axially forward or upstream so as to close both the slots 46 and the liner passage 54. This valve position effectively decreases the mixing area which will tend to decrease the volume of engine bypass flow through the bypass duct. The closed valve position also causes a majority of the reduced level of bypass flow to enter the daisy mixers 30 and be directed into the core engine inlet thereby reducing the bypass ratio. This ensures that the oxygen in the bypass flow is available for combustion during afterburner operation. It is to be noted that the closed position is obtained by a simple additional translation of the valve from the nominal position.

Figure 8:
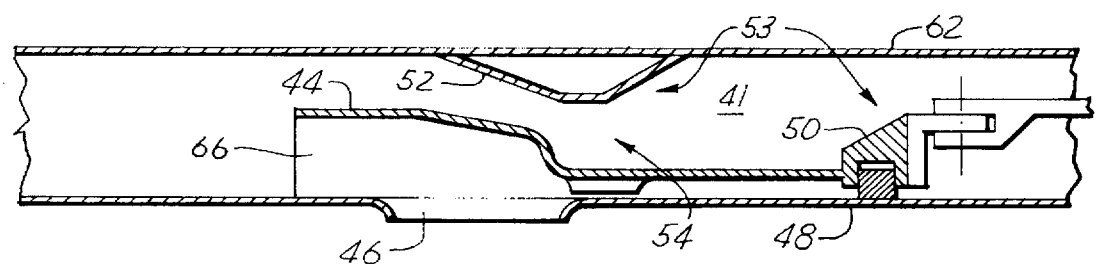
FIG. 8 is a cross-sectional view of the VABI of the present invention in an "open" mode of operation.

In order to make objective gains at part power loiter and cruise conditions and at dry military power (IRP) combat condition, the VABI is opened from the nominal fixed case to increase the bypass ratio. Referring now to FIG. 8 the desired position of the sleeve valve 44 is shown for an "open" mixer area. An entry air scoop 66 of the sleeve valve 44 is positioned over the slots 46 to direct a portion of bypass airflow through the slots and into the core engine stream.

That portion of the bypass flow that is not redirected by the scoops 66 is allowed to flow through the liner passage 54 and, eventually, out the exhaust nozzle of the engine. In this position additional core stream mixing of bypass flow is accomplished to improve thermal and pressure uniformity, hence propulsive efficiency, of the engine. This occurs because the air flowing through slots 46 is in direct alignment with and augments the fixed mixer air.

With this engine structure and method of operation, the variable slot VABI achieves many of the desirable objectives of previously conceived VABI's but does not require the large, complex structures of some of these previous designs. Simplicity, lighter weight, and smaller size can be significant advantages in the field of aircraft engines where size, weight, and cost are major factors in aircraft performance and affordability.

Although a specific embodiment of this invention has been illustrated and described, it is to be understood that various modifications could be made without departing from the spirit and scope of the invention. What is desired to be secured by Letters Patent of the United States is claimed below:

What is claimed is:

1. An improved gas turbine engine of the type having an inlet for supplying an airflow to a core engine, duct means for bypassing a portion of the inlet airflow around the core engine, a fixed geometry mixer for injecting a portion of the bypass stream into the core engine exhaust stream, an augmentor including a flameholder in an exhaust region of the engine disposed downstream of said mixer for receiving the mixed streams and directing them to an exhaust nozzle, an annular passage circumscribing, the exhaust region, and an augmentor liner wherein the improvement comprises:

a Variable Area Bypass Injector (VABI) that includes outlet means disposed in an upstream end of said liner and downstream of said flameholder in flow communication with said annular passage and means for varying the area of said outlet means from the annular passage for the purpose of simultaneously varying flow rates of bypass flow through the mixer, through the outlet means into said augmentor and, additionally, through the annular passage downstream of the outlet means.

2. The gas turbine engine recited in claim 1 wherein said means for varying cross-sectional area of the outlet means comprises a translating sleeve that slides axially over the outlet means in the annular passage and thereby modulates the rate of bypass flow therethrough.

3. The gas turbine engine recited in claim 2 wherein said translating sleeve includes a circumferentially disposed scoop for collecting bypass flow and directing that flow into said outlet means in the annular passage.

4. The gas turbine engine recited in claim 2 wherein said VABI includes a liner valve that cooperates with axial translation of said sleeve to change an opening of a liner passage to thereby vary the rate of bypass flow through the annular passage downstream of the outlet means and to said exhaust nozzle liner.

5. The gas turbine engine recited in claim 2 wherein said translating sleeve provides outlet area variation and additionally synchronizes axial translation around the circumference of the sleeve with the use of non-actuated pivots.

6. The gas turbine engine recited in claim 4 wherein said liner valve comprises a radially extending circumferential flange on the translating sleeve that cooperates with an exhaust casing projection to change the opening of the liner valve.

7. The gas turbine engine recited in claim 1 wherein said outlet means is comprised of a plurality of air admission slots in said exhaust nozzle liner and said mixer comprises a daisy mixer having a plurality of circumferentially spaced fixed chutes, said slots being arranged in axial alignment with said fixed chutes of the mixer so as to improve dry mixing performance.

8. An improved gas turbine engine of the type having an inlet for supplying an airflow to a core engine, duct means for bypassing a portion of the inlet airflow around the core engine, a fixed geometry mixer for injecting a portion of the bypass stream into the core engine exhaust stream to provide a mixed stream, an exhaust region of the engine disposed downstream of said mixer for receiving the mixed streams and directing them to an exhaust nozzle, an augmentor including a flameholder in the exhaust region, an annular passage circumscribing the exhaust region, and an exhaust nozzle liner, wherein the improvement is a Variable Area Bypass Injector (VABI) that comprises:

a translating sleeve that slides axially over an outlet comprising a plurality of slots disposed in an upstream end of said liner and downstream of said flameholder and in flow communication with the annular passage for the purpose of simultaneously varying flow rates of bypass flow through the mixer, through the slots into said augmentor and, additionally, through the annular passage downstream of the slots.

9. The gas turbine engine recited in claim 8, wherein said VABI includes a liner valve that cooperates with axial translation of said sleeve to change an opening of a liner passage to thereby vary the rate of bypass flow through the annular passage downstream of the slots.

10. The gas turbine engine of claim 9 wherein said liner valve comprises a radially extending circumferential flange on the translating sleeve, that cooperates with an exhaust casing projection to change the opening of the liner valve.

11. The gas turbine engine of claim 8 wherein said translating sleeve includes a circumferentially disposed scoop for collecting bypass flow and directing that flow into said outlet in the annular passage.

12. An improved gas turbine engine of the type having an inlet for supplying an airflow to a core engine, duct means for bypassing a portion of the inlet airflow around the core engine, a fixed geometry mixer for injecting a portion of the bypass stream into the core engine exhaust stream, an exhaust region of the engine disposed downstream of said mixer for receiving the mixed streams and directing them to an exhaust nozzle, an augmentor including a flameholder in the exhaust region, an annular passage circumscribing the exhaust region, and an exhaust nozzle liner wherein the improvement is a Variable Area Bypass Injector (VABI) that comprises:

a translating sleeve that slides axially over an outlet comprising a plurality of slots disposed in an upstream end of said liner and downstream of said flameholder and in flow communication with the annular passage for the purpose of simultaneously varying flow rates of bypass flow through the mixer, through the slots into said augmentor and, additionally, through the annular passage downstream of the slots;

a liner valve comprising a radially extending circumferential flange on the translating sleeve, wherein said flange cooperates with an exhaust casing projection to change an opening of a liner passage to thereby vary the rate of bypass flow through the liner valve and into that portion of the annular passage that is downstream of the slots; and wherein said translating sleeve includes a circumferentially disposed scoop for collecting bypass flow and directing that flow into the slots in the annular passage.

13. An improved gas turbine engine of the type having an inlet for supplying an airflow to a core engine, duct means for bypassing a portion of the inlet airflow around the core engine, a fixed geometry mixer for injecting a portion of the bypass stream into the core engine exhaust stream, an augmentor including a flameholder in an exhaust region of the engine disposed downstream of said mixer for receiving the mixed streams and directing them to an exhaust nozzle, an annular passage circumscribing the exhaust region, and an augmentor liner wherein the improvement comprises:

a Variable Area Bypass Injector (VABI) that includes outlet means disposed in an upstream end of said liner and downstream of said flameholder and in flow communication with said annular passage, and an axially translating sleeve effective for varying cross-sectional area of said outlet means from the annular passage for the purpose of controlling the flow rate of the bypass flow into said augmentor.

14. The gas turbine engine recited in claim 13 wherein said translating sleeve includes a circumferentially disposed scoop for collecting bypass flow and directing that flow into said outlet means in the annular passage.

15. The gas turbine engine recited in claim 14 wherein said VABI includes a liner valve that cooperates with axial translation of said sleeve to change an opening of a liner passage to thereby vary the rate of bypass flow through the annular passage downstream of the outlet means and into the exhaust nozzle liner.

16. The gas turbine engine recited in claim 13 wherein said outlet means is comprised of a plurality of air admission slots in said exhaust nozzle liner and said mixer comprises a daisy mixer having a plurality of circumferentially spaced fixed chutes, said slots being arranged in axial alignment with said fixed chutes of the mixer so as to improve dry mixing performance.

17. In a mixed flow augmentable gas turbine engine, including a fan, a core engine, a bypass duct effective for bypassing fan air over said core engine, and an augmentor having an inlet, a cooling liner, a flameholder and an annular passage, said inlet being in flow communication with said core engine, said flameholder being disposed in said inlet, and said annular passage being disposed circumferentially around said cooling liner and in flow communication with said bypass duct, an improvement comprising:

a fixed geometry mixer disposed between said core engine and said augmentor inlet and effective for mixing airflow from said bypass duct with gases discharged from said core engine and channeling said mixed airflow and gases into said augmentor upstream of said flameholder;

a plurality of circumferentially spaced slots disposed in an upstream end of said cooling liner and downstream of said flameholder and in flow communication with said annular passage; and cylindrical sleeve valve means slidably mounted to said augmentor adjacent to said slots and effective for modulating airflow from said annular passage, through said slots, and into said augmentor downstream of said flameholder;

said valve means being positionable for covering said slots to block airflow therethrough during an augmented mode of operation of said gas turbine engine and being positionable for uncovering said slots during a dry mode of operation of said gas turbine engine.

18. An improved gas turbine engine according to claim 17 wherein said valve means cooperates with an engine casing defining an outer boundary of said annular passage to define a liner valve, said valve means thereby being also effective for simultaneously modulating flow through said slots and to said cooling liner.

19. An improved gas turbine engine according to claim 18 wherein said valve means is positionable during an intermediate mode of operation of said engine for covering said slots to block flow therethrough and, simultaneously, for allowing airflow to said cooling liner.

20. An improved gas turbine engine according to claim 18 wherein said gas turbine engine is operable in dry, intermediate, and augmented modes of operation and said valve means is positionable:

in said dry mode to allow bypass air to flow both through said slots into said augmentor, and to said liner;

in said intermediate mode to allow bypass air to flow to said liner and block bypass air from flowing through said slots; and in said augmented mode to block bypass air from flowing both through said slots and to said liner.

21. An improved gas turbine engine according to claim 17 wherein said mixer comprises a daisy mixer having a plurality of circumferentially spaced chutes add said slots are positioned downstream of and in alignment with corresponding ones of said chutes.

* * * * *